United States Patent [19]

Reiff et al.

[11] 4,282,654
[45] Aug. 11, 1981

[54] MEASURING AND/OR TRACING DEVICE

[75] Inventors: Karl Reiff, Plochingen; Wolfgang Wagner, Warnau; Klaus Masur, Esslingen, all of Fed. Rep. of Germany

[73] Assignee: C. Stiefelmayer KG, Fed. Rep. of Germany

[21] Appl. No.: 2,162

[22] Filed: Jan. 9, 1979

Related U.S. Application Data

[62] Division of Ser. No. 778,808, Mar. 17, 1977, Pat. No. 4,149,317.

[30] Foreign Application Priority Data

Mar. 30, 1976 [DE] Fed. Rep. of Germany ....... 2613451

[51] Int. Cl.³ .............................................. G01B 3/00
[52] U.S. Cl. .................... 33/1 M; 33/169 R; 188/44
[58] Field of Search ............... 33/1 M, 174 P, 174 L, 33/139, 169 R; 188/67, 44, 166

[56] References Cited

U.S. PATENT DOCUMENTS

| 604,557 | 5/1898 | Baum | 188/44 X |
|---|---|---|---|
| 829,534 | 8/1906 | Ludlow | 188/44 |
| 2,717,663 | 9/1955 | Higgins | 188/67 X |
| 3,273,671 | 9/1966 | Vrana | 188/44 |
| 3,353,275 | 11/1967 | Porath | 33/174 P |
| 3,812,589 | 5/1974 | Schultheis | 33/139 |
| 4,149,317 | 4/1979 | Reiff et al. | 33/1 M |

FOREIGN PATENT DOCUMENTS 915226  1/1963  United Kingdom ................. 33/174 P Primary Examiner—William D. Martin, Jr.
Attorney, Agent, or Firm—William A. Drucker

[57] ABSTRACT

A measuring and/or tracing device is of the kind having a vertical column, a transverse sliding unit secured to the column and movable in a vertical direction, a cross arm held by said unit and movable horizontally, a holder on the end of the said cross arm for a measuring and/or tracing tool, and a counterweight being disposed inside the column so that it can move freely and being attached to the transverse sliding unit by a cable passing over a guide roller at the upper end of the column. The improvement comprises a safety braking device attached to the transverse sliding unit and acting in conjunction with external surfaces of the column, to which braking device the cable is secured, and which in consequence of the cable tension exerted, is held in a disengaged position out of contact with the outer surfaces of the column, but which, when the cable tension falls, drops automatically into the braking position and engages by gripping rollers or balls with the outer surfaces of the column, thereby preventing movement.

5 Claims, 5 Drawing Figures

MEASURING AND/OR TRACING DEVICE

This is a Division from our co-pending application Ser. No. 778808 filed 17 Mar. 1977, on which U.S. Pat. No. 4,149,317 issued on 4/17/1979.

The invention concerns a measuring and/or tracing device with a vertical column to which is secured a transverse sliding unit which can be moved in a vertical direction and which holds a cross arm moving horizontally, on the end of which is a holder for the measuring and/or tracing tool, the transverse sliding unit being balanced by a counterweight which, preferably, is contained inside the column so that it can move freely and is attached to the transverse sliding unit by a cable passing over a guide roller at the upper end of the column. This measuring and/or tracing device is usually in the form of a three-dimensional apparatus which can be moved along one side of a horizontal levelling plate by means of a carriage bearing the vertical column.

The counterweight is usually made of lead and moves freely up and down inside the column corresponding to manually operated displacement of the transverse sliding unit and the cross arm. The weight of the counterweight corresponds approximately to that of the transverse sliding unit together with the cross arm and the tool holder which, depending on the size of the device, can easily be as much as 50 kg or even more. As a result of this balancing, the transverse sliding unit, with the cross arm, can be easily moved, thereby ensuring a high degree of operating convenience. In spite of the fact that the cable can be in the form of a wear-resistant and high-tensile wire rope, it is impossible entirely to exclude the risk of rupture of the wire or cable, due to wear which cannot be recognized in time. Should the cable break, there is a danger that the transverse sliding unit, together with the cross arm, will suddenly fall down along the vertical column. With the heavy transverse sliding unit and cross arm, and a high initial position on the column prior to a sudden cable failure, the result would be a high energy impact due to the large potential energy and the acceleration due to gravity. Such an impact can cause severe injury to operating staff who may happen to be underneath the cross arm, even with fatal results due to the blow. Apart therefrom, such an impact can lead to damage to, or even complete destruction of the entire equipment and also of the plane surface of the levelling plate on to which the workpieces to be measured or traced are clamped and of any such clamped workpieces themselves. There can thus also be very considerable material damage.

OBJECT OF THE INVENTION

The object of the invention is to present a device of the category initially described which obviates this possibility and in which the risk is excluded of a sudden drop of the transverse sliding unit, with the cross arm, should the cable itself break or the counterweight or the transverse sliding unit be torn from the cable, thereby makng a major contribution to the safety of operation where personal injury and material damage are concerned.

SUMMARY OF THE INVENTION

With a device of the type described above, as envisaged by the invention, this object is achieved by means of a safety braking device attached to the transverse sliding unit, acting in conjunction with the corresponding outside surfaces of the column, to which the cable is secured and which, in consequence of the cable tension exerted, is held in the disengaged position, out of contact with the outer surfaces of the column but, when the cable tension falls, especially in the event of cable failure, drops automatically into the braking position and engages by gripping rollers or balls with the outer surfaces of the column, thereby preventing movement. This safety braking device operates immediately the cable tension drops significantly or falls suddenly, that is to say, when the cable itself breaks or if the counterweight or the transverse sliding unit break away from the cable. In this event, the safety braking device drops automatically into its braking position and prevents the transverse sliding unit on the column from falling down of its own accord. This represents a major contribution to the safety of operation where personal injury and material damage are concerned. The operating and safety characteristics of the equipment are thus substantially enhanced without impairing that ease of operation inherent in the counterbalanced suspension of the transverse sliding unit and cross arm.

The braking elements are in the form of cylindrical gripping rollers or gripping balls fitted in the region of both mutually opposite outer surfaces of the column.

In an advantageous embodiment, the layout is such that, on each side of the transverse sliding unit facing an outer surface of the column, a longitudinal strip is fitted at a distance from the outer surface, of which the inner surface facing the outer surface is in the form of a flat oblique surface inclined towards the central longitudinal axis of the column in such a way that, together with the corresponding outer surface of the column, it forms a gripping slot tapering like a wedge towards the upper end of the column, and that, in each gripping slot, there is a cylindrical gripping roller which is acted upon and flexibly forced into the gripping slot by at least one compression spring fitted in the transverse sliding unit and preferably by two compression springs located at a distance from one another along the cylindrical gripping roller. The arrangement can also be such that the pivoted frame is in the form of a U-shaped bracket, the pivoting axis of which runs at approximately right angles to the central longitudinal axis of the cylindrical gripping rollers and to the two flanks of the bracket, and that each bracket flank bears a tongue extending above the corresponding cylindrical gripping roller and approximately parallel to it and to the corresponding outer surface of the column, this tongue running at a short distance from the outer surface of the column and between it and the central longitudinal axis of the cylindrical gripping roller and, when the force of the cable is exerted on the pivoted frame, engages in the gripping slot from above and from the side opposite the compression spring, presses eccentrically with its lower edge against the cylindrical gripping roller and forces the latter vertically downwards out of the gripping slot and, at the same time, obliquely thereto away from the outer surface of the column and against the oblique surface.

In the case of this embodiment, too, there is, in the disengaged position of the safety braking device, no contact between the cylindrical gripping rollers and the outer surfaces of the column, because, in this position, the U-shaped bracket is held, against the force exerted by the cable, in a position in which it lies in, for example, a horizontal plane. At the same time, the tongues of each U-shaped flank press in a vertical direction, and opposite to the direction of taper of the gripping slot, against the corresponding cylindrical gripping rollers, in the region of a cylinder generatrix running with parallel displacement towards the vertical diametral plane of the cylindrical gripping rollers. As a result, the cylindrical gripping rollers are forced out of the gripping slot and also, within the horizontal plane, away from the outer surface of the column and against the oblique face of the gripping slot. In the process, the compression springs on the cylindrical gripping rollers resisting this movement are compressed. If the force of the cable is reduced, then the compression springs force the cylindrical gripping rollers into the gripping slot. In addition, the transverse sliding unit can move slightly along the column, in consequence of which the cylindrical gripping rollers which, when the safety braking device operates, come into contact with the outer surface of the column, are additionally moved by rolling into the gripping slot, in the event of the compression springs being unable, of themselves, to bring this about or, contrary to expectations, be ineffective as a result of breakdown or damage. Due to the movement of the cylindrical gripping rollers into the gripping slot, the tongues are raised vertically, causing the U-shaped bracket to be rotated around its pivoting axis from its normal position into, for example, an inclined position. The safety braking device in this form is of simple design and exceptionally reliable. A brake adjusting spring in the form of a cylindrical compression spring can be fitted between each flank on the bracket and the transverse sliding unit. This provides additional safety, as it means that a second spring-loaded restoring force acts on the U-shaped bracket in the event of cable failure. At least one of the longitudinal strips can have, as a thrust block for the pivoted frame when the cable force is exerted, a stop which should preferably be adjustable and which projects vertically and faces the corresponding bracket flank. This stop limits the depth to which the tongues can pass into the gripping slot and thus also the movement of the cylindrical gripping rollers out of and across the gripping slot.

BRIEF DESCRIPTION OF THE DRAWINGS

The invention is described in greater detail below, with the aid of the embodiment shown in the drawings, which depict.

DESCRIPTION OF THE PREFERRED EMBODIMENT

Figure 1:
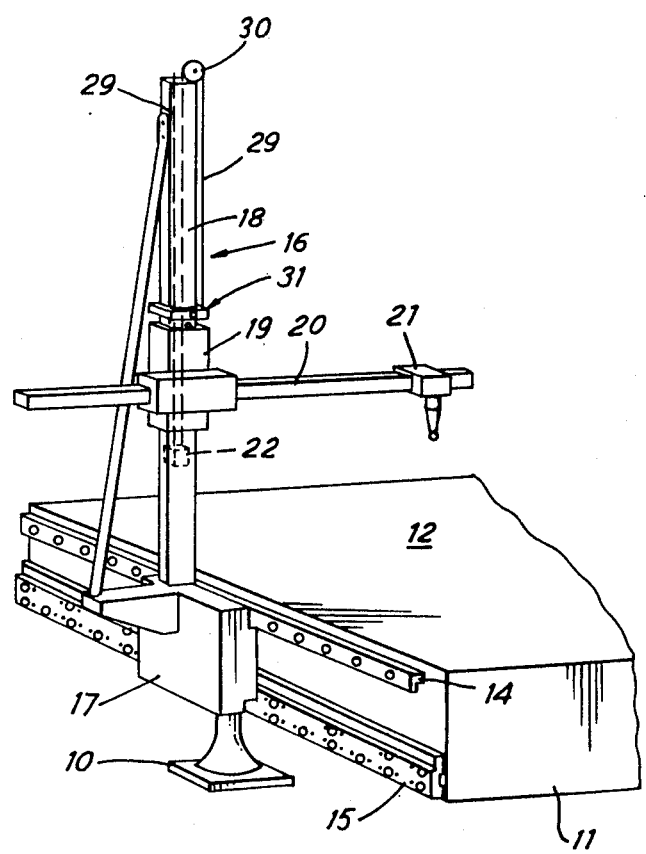
FIG. 1 is a perspective diagrammatic view of a three-dimensional measuring and/or tracing device with a levelling plate.

FIG. 1 shows a stationary levelling plate 11, supported on a foot 10, with an upper plane surface 12 on to which the workpieces to be measured and/or traced can be clamped. On its visible longitudinal side, the levelling plate 11 has an upper angles rail 14, and below the latter, a guide rail 15 on and along which a three-dimensional measuring and/or tracing device 16 can move along the longitudinal side of the levelling plate 11 by means of a carriage 17 with a vertical column 18 mounted thereon perpendicular to the plane surface 12, on which a transverse sliding unit 19 can move, on which a cross arm 20 is adjustably mounted to move in a horizontal direction and parallel to the plane surface 12. Near the end of the cross arm 20 is a holder 21 for a measuring or tracing tool which is not illustrated.

The transverse sliding unit 19 thus carries the cross arm 20 with the holder 21 and can, in the case of large devices, be of considerable weight, which can easily be as much as 50 kg or even more. For the purpose of ease of movement of the transverse sliding unit 19 along the column 18, the transverse sliding unit is balanced by a counterweight 22 shown by broken lines in FIG. 1. The column 18 is of rectangular cross-section and is hollow inside. It has two outer surfaces 223 and 226, (see FIGS. 2 and 3), opposite and parallel to one another. The counterweight 22 is usually made of lead and is contained inside the column 18 where it can move freely. Attached to counterweight 22 is a cable 29 which runs inside the column 18, passes over a guide roller 30 at the upper end of the column and continues with its clearly visible section outside the column 18 as far as the transverse sliding unit 19, to which it is attached.

In the event of breakage of the cable 29 or detachment of the counterweight 22 or the transverse sliding unit 19, there is a danger that the transverse sliding unit 19, together with the cross arm 20, the holder 21 and any tool attached thereto will suddenly fall vertically down along the column 18, causing injury to persons and/or material damage. This is prevented by a safety braking device 31 mounted on the transverse sliding unit 19 and operating in conjunction with the corresponding outer surfaces 223 and 226 of the column 18. The visible end of the cable 29 is attached to the safety braking device 31. As a result of the force exerted by the cable, the device 31 is held in the disengaged position indicated by solid lines and out of contact with the outer surfaces 23, 26 of the column 18. If, however, the tension of the cable should drop, such as in the event of breakage of the cable, then the device 31 falls automatically into its braking position and engages, in such a manner as to block any movement, with the outer surfaces 23 and 26 of the column 18.

A longitudinal strip 271, 272 is fitted, at a distance from the outer surface 223 and 226, to each side of the transverse sliding unit 219 corresponding to an outer surface 223 and 226 of the column 218. The inner surface of each longitudinal strip 271, 272 facing the outer surface 223 and 226 is in the form of a flat oblique surface which is inclined towards the central longitudinal axis of the column 235 in such a way that, together with the corresponding outer surface 223 and 226, it forms a gripping slot 275 or 276 tapering, in the form of a slight wedge, towards the upper end of the column, in each case at an inclination of, for example, 3°. In each gripping slot 275 and 276, there is a cylindrical gripping roller 277 or 278 which is acted upon and flexibly forced into the gripping slot 275 or 276 by two compression springs fitted vertically in the transverse sliding unit 219 at a distance from one another and along its central longitudinal axis. Of these compression springs, the springs 279, 280 of the cylindrical gripping roller 277 seen on the right in FIG. 2, and only one spring 281 of the left-hand cylindrical gripping roller 278 are visible.

The pivoted frame is designed in the form of a U-shaped bracket 282, the pivoting axis 236 of which runs at approximately right angles to the central longitudinal axis of the cylindrical rollers 277, 278 and to its two bracket flanks 283, 284.

Figure 2:
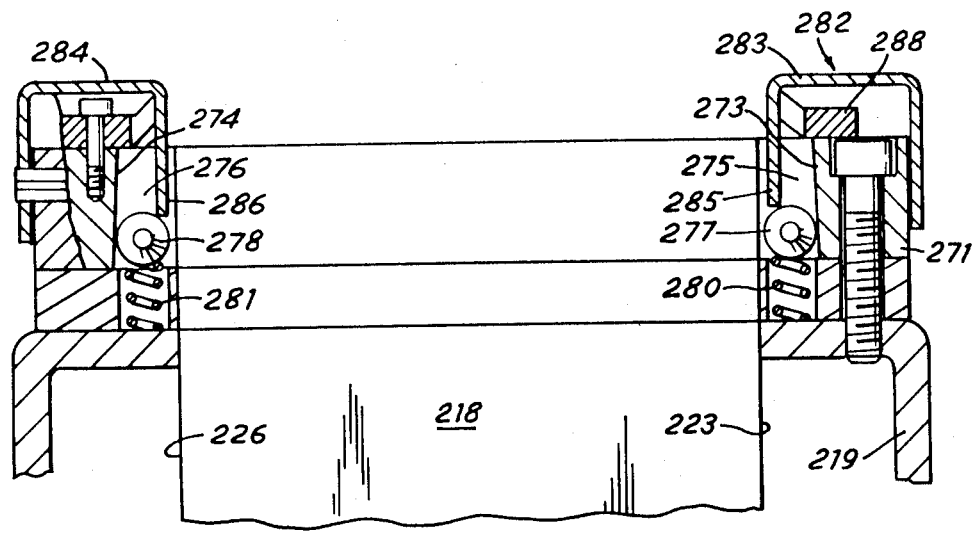
FIG. 2 a vertical longitudinal section through a part of a transverse sliding unit with a safety braking device.
Figure 5:
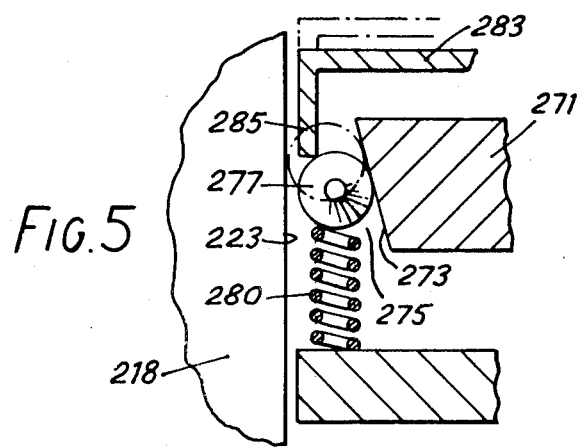
FIG. 5 an enlarged vertical longitudinal section through a part of the safety braking device in accordance with FIG. 2, the braking elements of which are shown as solid lines in the disengaged position and as broken lines in the braking position.

As is shown especially in FIGS. 2 and 5, each bracket flank 283, 284 bears a tongue 285, 286 extending above the corresponding cylindrical gripping roller 277 or 278 and approximately parallel to it and to the corresponding outer surface 223 or 226 of the column 218. Each tongue 285, 286 runs at a short distance from the outer surface 223 or 226 of the column 218 and between it and the central longitudinal axis of the corresponding cylindrical gripping roller 277 or 278. When the force of the cable is exerted on the U-shaped bracket 282, the tongue 285, 286 engages in the corresponding gripping slot 275 or 276 in a vertical direction from above and from the side opposite to the compression spring 279, 280 or 281. Each tongue 285, 286 presses eccentrically against the corresponding cylindrical gripping roller 277 or 278 and, in the illustration according to FIG. 2, forces it downwards out of the corresponding gripping slot 277, 276 and, at the same time—as seen within an approximately horizontal plane—, obliquely thereto away from the corresponding outer surface 223 or 226 of the column 218 and against the corresponding oblique surface 273 or 274. In the process, the corresponding compression springs 279, 280 or 281 are compressed and pre-stressed.

Figure 3:
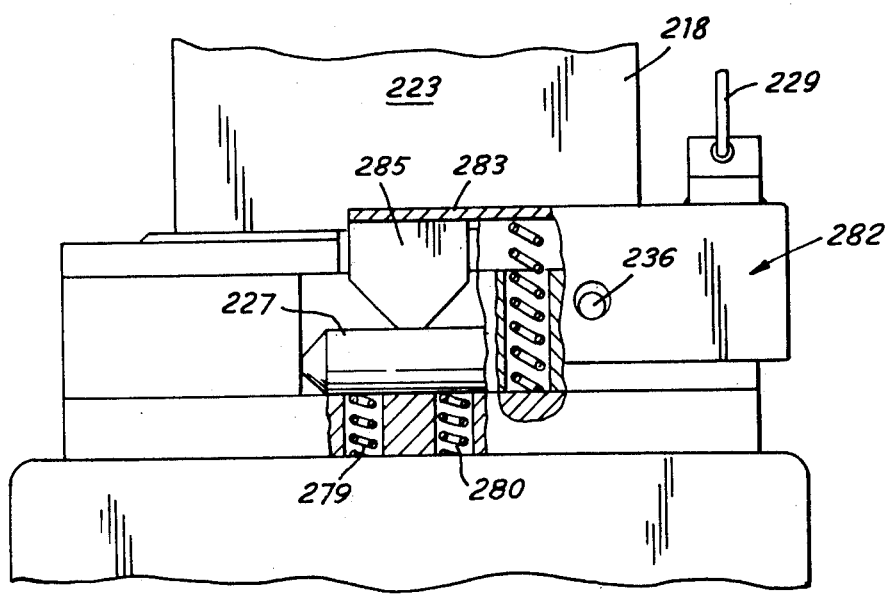
FIG. 3 a partly sectional side view of the transverse sliding unit with safety braking device in accordance with FIG. 2.
Figure 4:
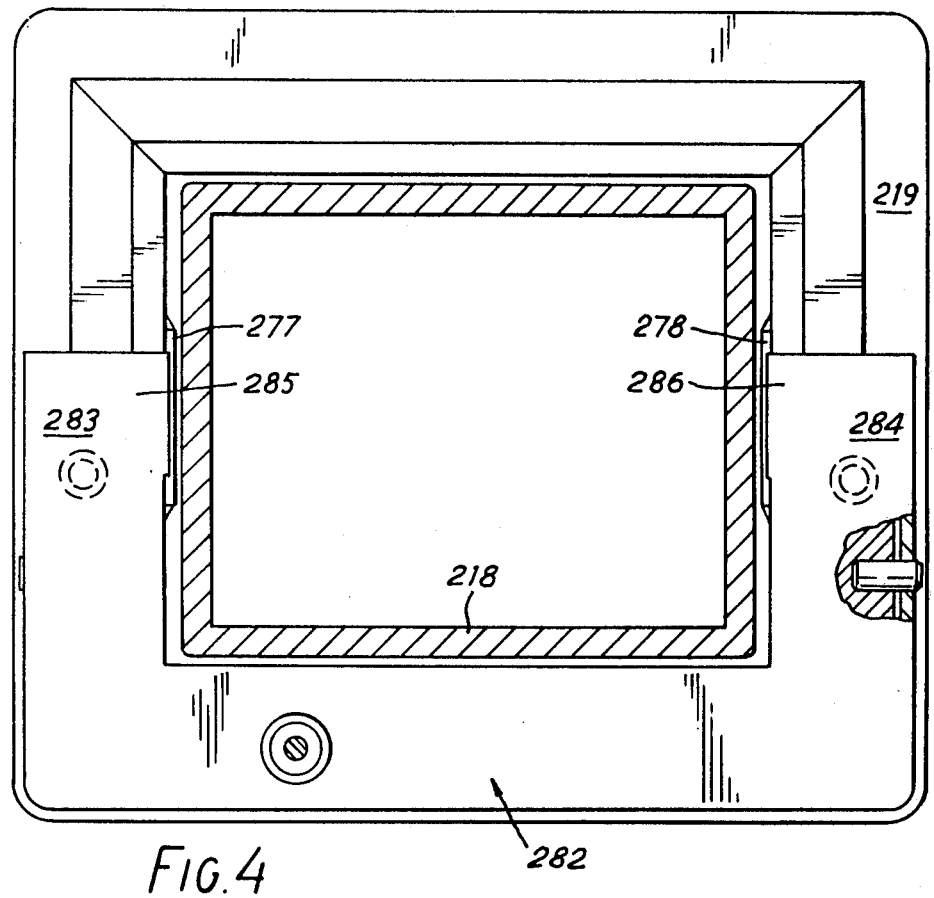
FIG. 4 a view from above of the transverse sliding unit with safety braking device.

As shown in FIG. 3 in the case of the bracket flank 283, a brake adjusting spring 287 in the form of a cylindrical compression spring is fitted between each flank of the bracket and the transverse sliding unit 219. This spring is secured and compressed endwise between the transverse sliding unit 219 and the bracket flank 283 as long as the U-bracket 282 is in the disengaged position shown in FIG. 3. This is shown, greatly enlarged, in FIG. 5. It will be seen that, in this disengaged position, the cylindrical gripping rollers 277, 278 are in each case at a distance from the corresponding outer surfaces 223 and 226. At least one of the longitudinal strips 271, 272 has, as a thrust block for the U-bracket 282 when the cable force is exerted, a stop 288 which is, for example, adjustable for height and which projects vertically and faces the corresponding bracket flank 283 or 284. In another embodiment, which is not illustrated, this stop can be located elsewhere and be of a different configuration.

There is, in the disengaged position, e.g. as in FIG. 5, no contact between the cylindrical gripping rollers 277, 278 and the corresponding outer surfaces 223 and 226 because, in this position, the U-bracket 282 is held, against the force exerted by the cable, in the position shown in FIG. 3, in which it lies in, for example, a horizontal plane. At the same time, the tongues 285, 286 of each bracket flank 283 or 284 press in a vertical direction, and opposite to the direction of taper of the gripping slot 275 or 276, against the corresponding cylindrical gripping rollers 277, 278 in the region of a cylinder generatrix running with parallel displacement towards the vertical diametral plane of the cylindrical gripping roller. As a result, the cylindrical gripping rollers 277, 278 are forced out of the gripping slot 275 or 276 and also—as seen within a horizontal plane—away from the outer surface 223 or 226 and against the corresponding oblique face 273 or 274. In the process, the compression springs 279, 280 or 281 are compressed. The limiting stop can also be fitted underneath the cylindrical gripping rollers 277, 278, for example, it can be the part in which the compression springs 279, 280 or 281 are held. If the cylindrical gripping roller is fully pressed in a vertical direction on to this strip-shaped part, then this determines the end position corresponding to the disengaged position.

If the force of the cable now drops, then the compression springs 279, 280 and 281 force the corresponding cylindrical gripping roller 277 or 278 into the gripping slot 275 or 276. The U-bracket 282 and, with it, the transverse sliding unit 219 are braced transversely to and with the column 218 in accordance with the gripping roller principle, and prevented from sliding vertically downwards. The cylindrical gripping rollers 277, 278, which are forced via the compression springs into the corresponding gripping slot 275 or 276, act in a vertical direction on the corresponding tongues 285 or 286, whereby the U-bracket 282 is rotated around its pivoting axis 236 into the braking position. This is reinforced by the additional brake adjusting spring 287, which acts directly on the bracket flank 283. In addition, when the force of the cable drops, the transverse sliding unit 219 moves very slightly on the column 218, in consequence of which the cylindrical gripping rollers 277, 278, which then come into contact with the corresponding outer surfaces 223 or 226 of the column 218, are additionally moved by rolling into the corresponding gripping slot 275 or 276, in the event of the compression springs 279, 280 and 281 being unable, of themselves, to bring this about or being ineffective as a result of breakdown or damage.

We claim:

1. In a measuring and tracing device, of the kind having:
    (i) a vertical column
    (ii) a transverse sliding unit secured to said column and movable in a vertical direction,
    (iii) a cross arm held by said unit and movable horizontally
    (iv) a holder on the end of said cross arm for a measuring and tracing tool
    (v) a counterweight to balance the transverse sliding unit, said counterweight being disposed inside the column so that it can move freely and being attached to the transverse sliding unit by a cable passing over a guide roller at the upper end of the column, the improvement which consists in that:
    (a) a safety braking device is attached to the transverse sliding unit and acts in conjunction with the external surfaces of the column, the cable being secured to the braking device so that, in consequence of the cable tension exerted, the braking device is held in a disengaged position out of contact with the outer surfaces of the column, whereas when the cable tensions falls, the braking device drops automatically into braking position and engages with the outer surfaces of the column, thereby preventing movement,
    (b) the column is of rectangular cross-section and has two outer surfaces opposite and approximately parallel to one another, the braking device having a pivoted frame mounted on the transverse sliding unit so that it can rotate around an axis disposed at a distance from the center of the column, the cable being attached to one side of the frame at a spacing from the pivoting axis, the other side of said frame having fitted thereto at a spacing from the pivoting axis
at least one vertical brake adjusting spring acting in the same direction as the force of the cable, said pivoted frame when rotating about the pivoting axis into the disengaged position and the braking position striking against braking elements fitted in the area of two opposite outer faces of the column and located, in the disengaged position, substantially out of contact with and at a spacing from the corresponding outer surface and, in the braking position, in contact with the corresponding outer surface in such a way as to prevent movement, said braking elements being cylindrical gripping rollers fitted in the region of both mutually opposite outer surfaces of the column.

2. A device, in accordance with claim 1, wherein on each side of the transverse sliding unit facing an outer surface of the column, a longitudinal strip is fitted at a distance from the outer surface, the inner surface of which strip facing the outer surface being a flat oblique surface inclined towards the central longitudinal axis of the column in such a way that, together with the corresponding outer surface of the column, it forms a gripping slot tapering like a wedge towards the upper end of the column, there being in each gripping slot a cylindrical gripping roller which is acted upon and flexibly forced into the gripping slot by at least one compression spring fitted in the transverse sliding unit.

3. A device, in accordance with claim 2, wherein the pivoted frame is a U-shaped bracket, the pivoting axis of which runs approximately at right angles to the central longitudinal axis of the cylindrical gripping rollers and to the two flanks of the bracket, each bracket flank bearing a tongue extending above the corresponding cylindrical gripping roller and aproximately parallel to it and to the corresponding outer surface of the column, said tongue running at a short distance from the outer surface of the column and between it and the central longitudinal axis of the cylindrical gripping roller whereby, when the force of the cable is exerted on the pivoted frame, said tongue engages in the gripping slot from above and from the side opposite the compression spring, presses eccentrically with its lower edge against the cylindrical gripping roller and forces the latter vertically downwards out of the gripping slot and, at the same time, obliquely thereto away from the outer surface of the column and against the oblique surface.

4. A device, in accordance with claim 3, wherein a brake adjusting spring in the form of a cylindrical compression spring is fitted between each flank of the bracket and the transverse sliding unit.

5. A device, in accordance with claim 2, wherein at least one of the longitudinal strips has, as a thrust block for the pivoted frame when the cable force is exerted, a stop which projects vertically and faces the corresponding bracket flank.

* * * * *